(No Model.)
D. BRIGHAM.
APPARATUS FOR WATERING STOCK.
No. 254,600. Patented Mar. 7, 1882.
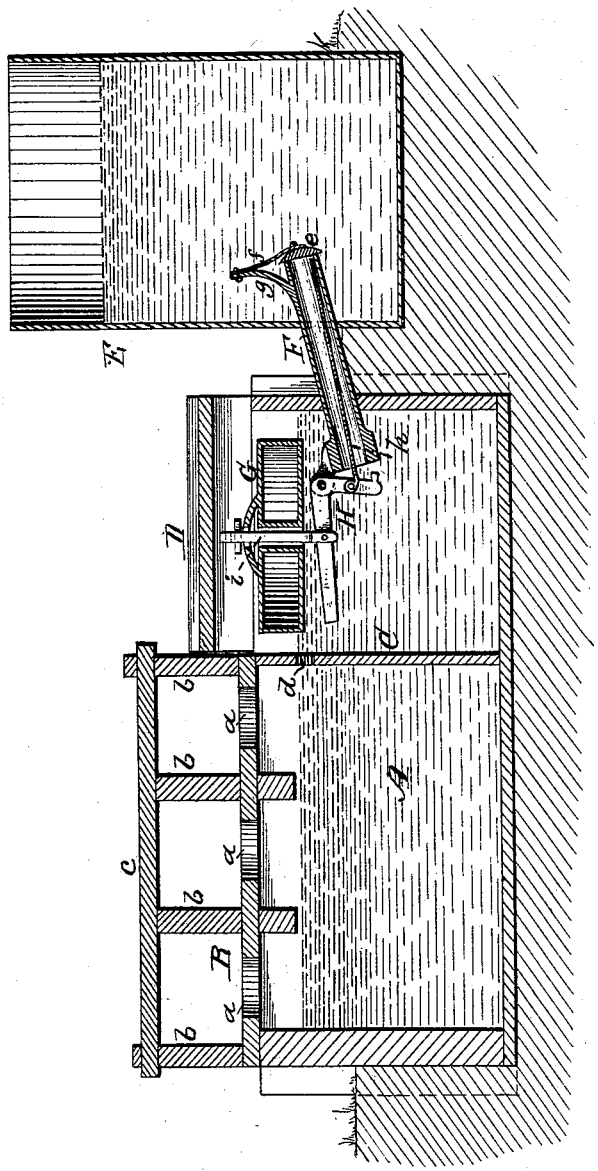
Witnesses.
P. L. Ourand
L. L. Miller
Inventor
Dan Brigham,
per Chas. H. Fowler,
Attorney

UNITED STATES PATENT OFFICE.

DAN BRIGHAM, OF CHATSWORTH, ILLINOIS.

APPARATUS FOR WATERING STOCK.

SPECIFICATION forming part of Letters Patent No. 254,600, dated March 7, 1882.

Application filed December 15, 1881. (No model.)

*To all whom it may concern:*

Be it known that I, DAN BRIGHAM, a citizen of the United States, residing at Chatsworth, in the county Livingston and State of Illinois, have invented certain new and useful Improvements in Apparatus for Watering Stock; and I do hereby declare that the following is a full, clear, and exact description of the same, reference being had to the annexed drawing making a part of this specification, and to the letters and figures of reference marked thereon.

The present invention has relation to certain new and useful improvements in apparatus for watering stock, and refers more particularly to that class in which the water is automatically fed to the tank or drinking-trough by a float and valve acting in conjunction with each other for controlling the supply of water.

The object of the present invention is to improve the construction of the attachments between the valve and float, whereby it will require less movement of the float up and down to open or close the valve, and will cause the tank or drinking-trough to be filled in much less time than when the common pinch-valve is employed. These objects I attain by the construction substantially as shown in the drawing and hereinafter described.

In the accompanying drawing, which represents a longitudinal vertical section of my invention, A designates the drinking compartment or trough, having the usual openings, $a$, on its top B and at both sides thereof, which have partitions $b$ between to keep the heads of the hogs apart when passing their snouts through the drinking-openings $a$, the partitions having connected to them a horizontal brace, $c$. The trough A is divided off into a separate compartment for the float and valve mechanism by a partition, C, having an openings, $d$, through which the water circulates. This chamber or compartment, containing the float and operating valve mechanism, is provided with a cover, D, which, together with the top B, may be removably connected to the tank or trough A, as found desirable.

The supply barrel or tank E is connected to the trough or tank A by a pipe, F, the ends of said pipe projecting into the same, as shown. Within the barrel or tank E is located the valve $e$, which closes the opening in the end of pipe F, the valve being caused to close tightly over the opening by a suitable spring, $f$, one end of which is connected to the valve and the opposite end to an arm, $g$, projecting from the pipe F. The valve $e$ is opened by a rod, $h$, the free end of which comes in contact with the inner face of said valve at its center. This rod $h$ passes through the pipe F, and is suitably connected to a bell-crank lever, H, which is pivoted to the pipe, and is connected with a float, G, by a rod, $i$, the lower end being pivoted to the lever, while the upper end passes up through a central opening in the float, and is attached thereto in any suitable manner. The weight of the water behind the valve $e$, in connection with the spring $f$, most effectually closes it, the spring serving the double purpose of a spring and hinge, and the great distance from the point of connection of the rod $h$ with the lever H and the valve will enable a more effective leverage power to be obtained, which opens the valve at once. When the float rises it brings away from the pipe F the upright arm of the bell-crank lever H, and draws with it the rod $h$ from contact with the valve $e$, when the pressure of the water in the tank or barrel E, in connection with the spring $f$, will close the valve and retain it closed until the water becomes low, when the end of the rod will immediately be brought in contact with the valve by the descending of the float and opened to allow a supply of more water to the tank or trough A.

It will be noticed that the end of the rod $h$ is not secured to the valve $e$, as heretofore, but independent of the same, and when of such length as not to support its own weight its free end rests upon the interior of the pipe F. Were the rod attached to the valve, the closing of the latter would be dependent entirely upon the action of the rod, and if the crank and float ceased to operate from any cause after the valve had been opened it would remain so, which would result in the overflow of the drinking-trough. This danger is entirely avoided by forming the rod and valve independent of each other, and connecting to the valve a spring by which it is automatically closed after the end of the rod is moved from contact therewith.

Having now fully described my invention, what I claim as new, and desire to secure by Letters Patent, is—

In an apparatus for watering stock, the tank or trough A and tank E, connected thereto by pipe F, said pipe having the valve e and spring, in combination with the float G, lever H, and rod h, the latter being disconnected or independent of the valve, and constructed to operate substantially as and for the purpose set set forth.

In testimony that I claim the above I have hereunto subscribed my name in the presence of two witnesses.

DAN BRIGHAM.

Witnesses:
 A. M. ROBERT,
 J. G. TRUE.